US010068149B2

(12) United States Patent
Karnos

(10) Patent No.: US 10,068,149 B2
(45) Date of Patent: Sep. 4, 2018

(54) IMAGE PROCESSING UTILIZING REFERENCE IMAGES

(71) Applicant: Intel Corporation, Santa Clara, CA (US)

(72) Inventor: Kristine M. Karnos, San Jose, CA (US)

(73) Assignee: INTEL CORPORATION, Santa Clara, CA (US)

(*) Notice: Subject to any disclaimer, the term of this patent is extended or adjusted under 35 U.S.C. 154(b) by 87 days.

(21) Appl. No.: 14/142,686

(22) Filed: Dec. 27, 2013

(65) Prior Publication Data
US 2015/0186743 A1 Jul. 2, 2015

(51) Int. Cl.
| G06K 9/46 | (2006.01) |
|---|---|
| H04N 5/232 | (2006.01) |
| H04N 5/235 | (2006.01) |
| H04N 5/272 | (2006.01) |
| G06F 17/30 | (2006.01) |
| G06K 9/62 | (2006.01) |

(52) U.S. Cl.
CPC ..... *G06K 9/4604* (2013.01); *G06F 17/30259* (2013.01); *G06K 9/6202* (2013.01); *H04N 5/232* (2013.01); *H04N 5/235* (2013.01); *H04N 5/23219* (2013.01); *H04N 5/272* (2013.01)

(58) Field of Classification Search
None
See application file for complete search history.

(56) References Cited

U.S. PATENT DOCUMENTS

| 7,057,650 B1* | 6/2006 | Sakamoto | H04N 1/3871 |
|---|---|---|---|
| | | | 348/218.1 |
| 2003/0039380 A1* | 2/2003 | Sukegawa | G06K 9/6255 |
| | | | 382/118 |
| 2014/0368671 A1* | 12/2014 | Watanabe | H04N 5/272 |
| | | | 348/207.1 |

FOREIGN PATENT DOCUMENTS

EP    1460586    9/2004

OTHER PUBLICATIONS

Extended European Search Report completed Jun. 23, 2015, in European Patent Application No. EP14191523.1, 6 pages.
Karsch, K. et al., "Rendering Synthetic Objects into Legacy Photographs," retrieved on the Internet at http://www.kevinkarsch.com/publications/sa11.html on Feb. 5, 2014.

* cited by examiner

*Primary Examiner* — Mark Roz
(74) *Attorney, Agent, or Firm* — Womble Bond Dickinson (US) LLP

(57) ABSTRACT

Embodiments are generally related to image processing utilizing reference images. An embodiment of a mobile device includes an image capture mechanism to capture a base image, the base image containing one or more objects including a target object; and a memory to store data, the data including the base image. The mobile device is to analyze the base image to identify one or more objects in the base image, and identify one or more reference images based on a comparison of one or more identified objects in the base image with reference images in a repository of images, wherein the one or more reference images include a first reference image containing the target object, the first reference image having a first set of first image characteristics.

13 Claims, 11 Drawing Sheets

IMAGE PROCESSING UTILIZING REFERENCE IMAGES

TECHNICAL FIELD

Embodiments relate to image processing. More particularly, embodiments relate to image processing utilizing reference images.

BACKGROUND

When addressing a choice of a particular item for a particular environment or in conjunction with another item, such as the choice of a element in a larger design or the choice of a particular product for purchase by a consumer to match with another item, the decision maker often does not have a realistic image of the final result prior to, for example, implementing the design or committing to a purchase. In particular, the matching of colors in different environments can be very difficult because the lighting in each environment can greatly modify the perceived color of an item.

Conventional tools to assist in forming an image of a potential final result are limited in capability and may come at a significant cost. For example, for color evaluation of an object, a decision maker, including an interior designer, can obtain color evaluation tools, including Pantone™ tools, to assist calibrating lighting and providing evaluations of color. However, these devices, including lighting indicator stickers, are generally expensive.

Further, a designer can carry color samples, such as color swatches, to compare under ambient light with an object of unknown color in order to obtain an estimation of matching color. However, this process requires carrying specialty products that provide needed colors, and requires special application of special skills by a designer to provide a satisfactory result.

For these reasons, decision makers are commonly left to use personal imaginations regarding the final result of a mix of items, thus often resulting in poor color matching of chosen items. Alternately, a decision maker may delay purchase to check a color swatch (increasing chance of not following through with purchase) or may purchase an item only to return it later, which costs the decision maker time and may cost the vendor lost sales and costs from processing returns.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
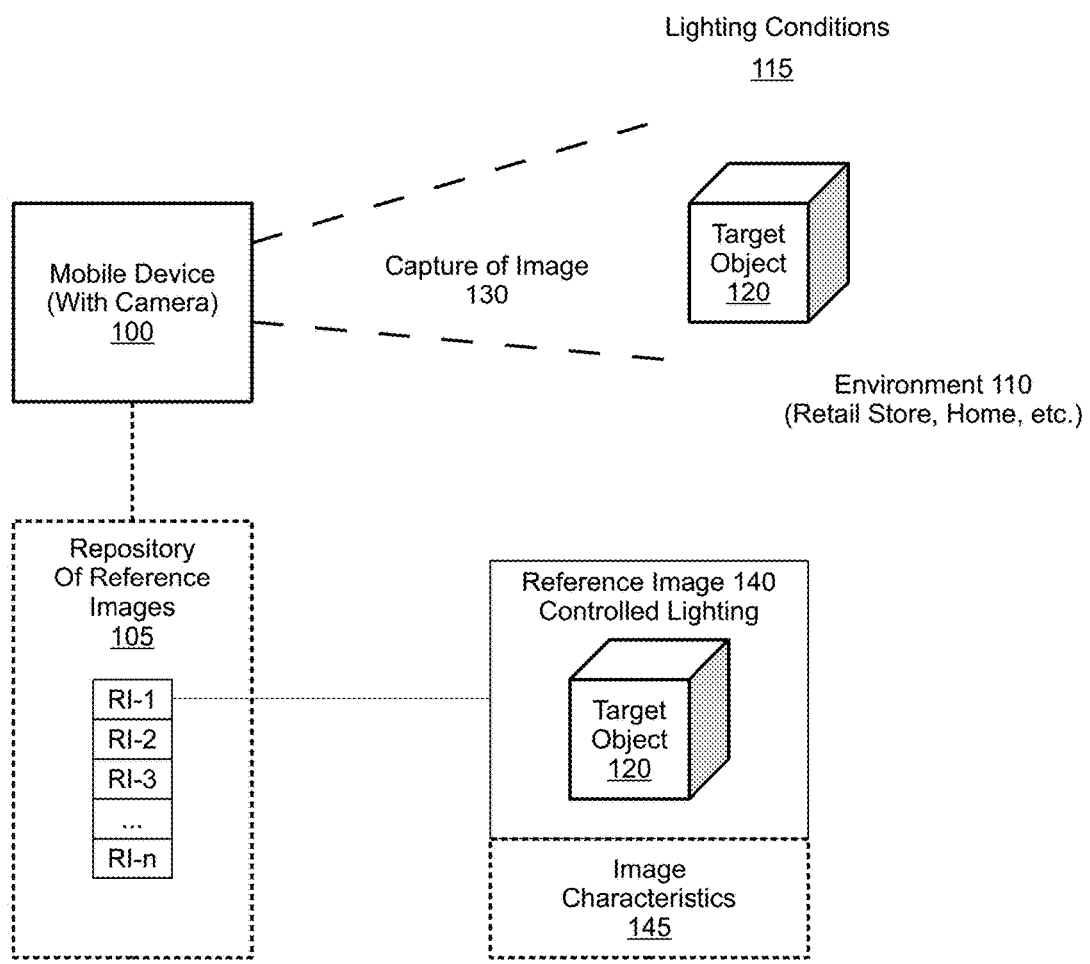
FIG. 1 is an illustration of reference image identification with a mobile device according to an embodiment.

Embodiments are generally related to image processing utilizing reference images.

In the following description, numerous specific details are set forth. However, embodiments may be practiced without these specific details. In other instances, well-known circuits, structures and techniques have not been shown in detail in order not to obscure the understanding of this description.

As used herein:

"Mobile device" means a smartphone, smartwatch, tablet computer, handheld computer, mobile Internet device, wearable technology, or other mobile apparatus that includes processing ability and communication ability.

"Image capturing mechanism" means a mechanism to capture a digital image of a scene. The term includes a still camera, a video camera, and other similar devices. The term includes a portion of a multi-purpose device, including a mobile device.

"Image characteristics" means characteristics of a particular image, the characteristics including one or more lighting factors, one or more color factors for the image, or both. Image characteristics are not limited to a single set of characteristics for an image, and may include, for example, certain characteristics for a first portion of the image and certain different characteristics for a second portion of the image, where the first portion of the image and the second portion of the image may have differing lighting.

Improved cameras in mobile devices are enabling photos to be utilized for numerous purposes, where the purposes may be both traditional (such as to capture an image to remember a person or scene) and new (such as to read a barcode or identify an object using a service, then look for competitive pricing, reviews, etc.). In particular, a camera of a mobile device may be used in choosing a particular item, where the representation of the item in a captured base image may be used to determine the suitability of the item, such as assisting in evaluating how well the item will coordinate in terms of color with another item (or items) or with a particular environment.

Certain mobile devices include a light that can serve as a flash, which may be used to improve a captured image under low lighting conditions. However, such mobile devices might not on their own correct for other issues connected to the lighting conditions, such as yellowish or bluish tone due to ambient lighting conditions and other lighting issues. Further, if a user of a mobile device camera finds that a flash would make an image too bright, the user may settle for greenish/bluish native lighting conditions for the photo, which may result in greenish or bluish coloring in the resulting photo. Thus, the lighting issues may significantly affect the color of an item that is being examined.

Further, certain existing smartphone apps for color identification may utilize a smartphone's camera to identify colors, enabling a person with color vision limitations to better interpret color. Further, a smartphone app may be intended for a user to allow finer grained distinctions among color differences, such as, for example, certain paint manufacturers providing color-matching apps for smartphones. However, the results of such apps are unreliable because the matching or coordination of colors is reliant on the lighting conditions for the photo being correct in order to judge the color of an item, and the light conditions are often far from ideal.

In an example, if an individual examines an item (for example, a rug) in a retail store, the individual may take a photograph to record an image of the item with the mobile device in the store's lighting conditions. As used in this description, the item may be referred to as a target object. The individual may later compare the color of the target object with colors in a particular location (for example, colors of walls and other items within a particular location). However, while still in the store, the individual can only imagine how the color will look under the typical lighting conditions of the room.

In some embodiments, an apparatus, method, or system provides for image processing utilizing references. In some embodiments, image processing includes a reference image identification function, wherein an image is searched for objects, and identified objects are compared with reference images to match one or more reference images containing an identified object.

For example, a store, a manufacturer, or other party may generate reference images by capturing an image of a particular reference object in controlled lighting conditions, with the resulting reference image and data regarding the lighting conditions being stored in a repository. In some embodiments, at least a part of the repository is stored on a mobile device. In some embodiments, at least a part of the repository is stored in a location that is external from the mobile device, such as a repository stored in cloud storage.

In an example, a user may be shopping and see an item to consider purchasing. In this example, the user may take a photograph of the item. In some embodiments, the item is recognized and compared with reference images for that item being sold. In an example, the store may maintain reference images containing the item, to enable easy recognition. Alternatively, the reference image may be looked up by barcode or other such identifier.

In some embodiments, image processing includes an image combining function, wherein a reference image containing a target object for a base image is identified, image characteristics for the reference image and for the base image are obtained, the image characteristics of the reference image and the base image are compared, one or more correction factors are generated based on the comparison, the correction factors are applied to the reference image, and the target object with correction is added to the base image to generate a combined image.

For example, in order to match color of a first clothing item in a store with an already purchased second item at home and thus to see if the colors are likely to be compatible, the shopper may utilize the image combining function to normalize lighting conditions and the two items in a combined image. In this manner, the function assists the shopper in making an informed purchase decision, while still in the store, using corrected colors in a combined image.

In some embodiments, image processing includes an image calibration function, wherein a base image for calibration is captured or retrieved, a reference image containing an object of the base image is identified, image characteristics for the reference image are obtained, the target objects in the base image and reference images are compared, image characteristics for the base image are calibrated, and the calibrated image characteristics for the base image are stored.

In an example, for calibration of images, a reference object may be a common object that a person might normally have on hand, for which one or more image images could be saved. The reference object may be an item that provides enough color information in comparison with the reference image to allow the mobile device to interpret an image's lighting conditions and correct for such conditions. In some embodiments, the correction factors may be according to default rules or according to user-selectable rules, such as to brighten and color-correct the captured image to create a modified image. In one possible example, a common item such as a dollar bill may serve as a reference object because such item is a convenient and consistent item. In another example, a small item, such as a credit card sized full-color reference image, may be used as a reference object.

In some embodiments, image processing includes an image modification function, wherein a reference image for a base image is identified, image characteristics for the reference image and the base image are obtained and compared, correction factors are generated based on the comparison, and the correction factors are applied to the base image to generate a modified image with modified lighting, modified color, or both.

Embodiments are not limited to any particular lighting conditions, and the different lighting conditions applied in a photo may vary based a particular intent for the image modification. In one example, the lighting conditions applied in a modified image may be better or brighter lighting if, for example, the goal of the operation is rapid photo enhancement, such as color correction or brightening. In another example, the lighting conditions may be different, though not necessarily better, lighting conditions if, for example, a goal is to match lighting conditions of a particular environment.

In some embodiments, an apparatus or system may automatically apply correction factors to captured images before the apparatus or system saves the images, such as duplicate or alternative images saved to the phone, or before automatically uploading the images to cloud storage. In some embodiments, an apparatus or system includes an automatic image modification function to provide for such automatic application of correction factors. In some embodiments, the automatic modification can be automatically disabled after some period of time if additional images are not captured.

FIG. 1 is an illustration of reference image identification with a mobile device according to an embodiment. In some embodiments, a mobile device 100 including a camera or other image capture element captures an image 130. In some embodiments, the image capture element may include a mechanism to capture video images as well as a mechanism to capture still images. As provided, the captured image may be in environment 110, such as a retail store, home, or other location, with lighting conditions 115. The captured image may contain a particular target object 120. While for simplicity the various items are shown as blocks, the items can be of any shape and size.

In some embodiments, the mobile device 100 searches the captured image for potential objects to compare with reference objects contained in reference images in a repository of images 105, wherein all or a part of the repository may be located within the mobile device, or in an external location, such as in cloud storage. In some embodiments, upon identifying an object, such as target object 120, the mobile device identifies one or more reference objects based upon a comparison of the object with objects contained in one or more reference images, such as reference image 140 having a set of image characteristics 145. The reference image may be captured under controlled lighting conditions. In some embodiments, the comparison may be performed by the mobile device. In some embodiments, the comparison may be performed by an external device, such as external server that accesses a repository of images. In some embodiments, the mobile device is to provide at least a part of the captured image to the external device, and the mobile device is to receive one or more references from the external device is the comparison is successful.

Figure 2:
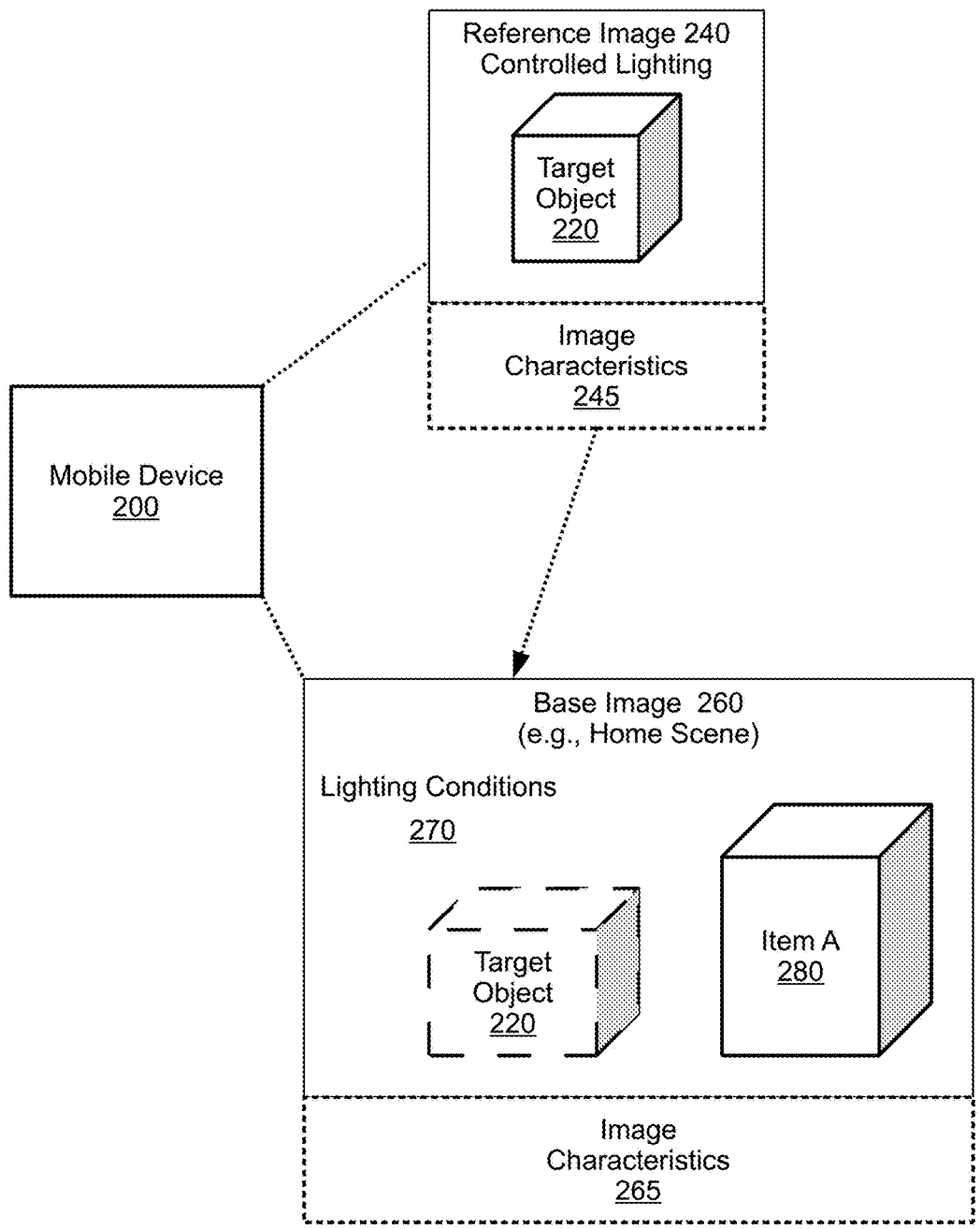
FIG. 2 is an illustration of image combining according to an embodiment.
Figure 3:
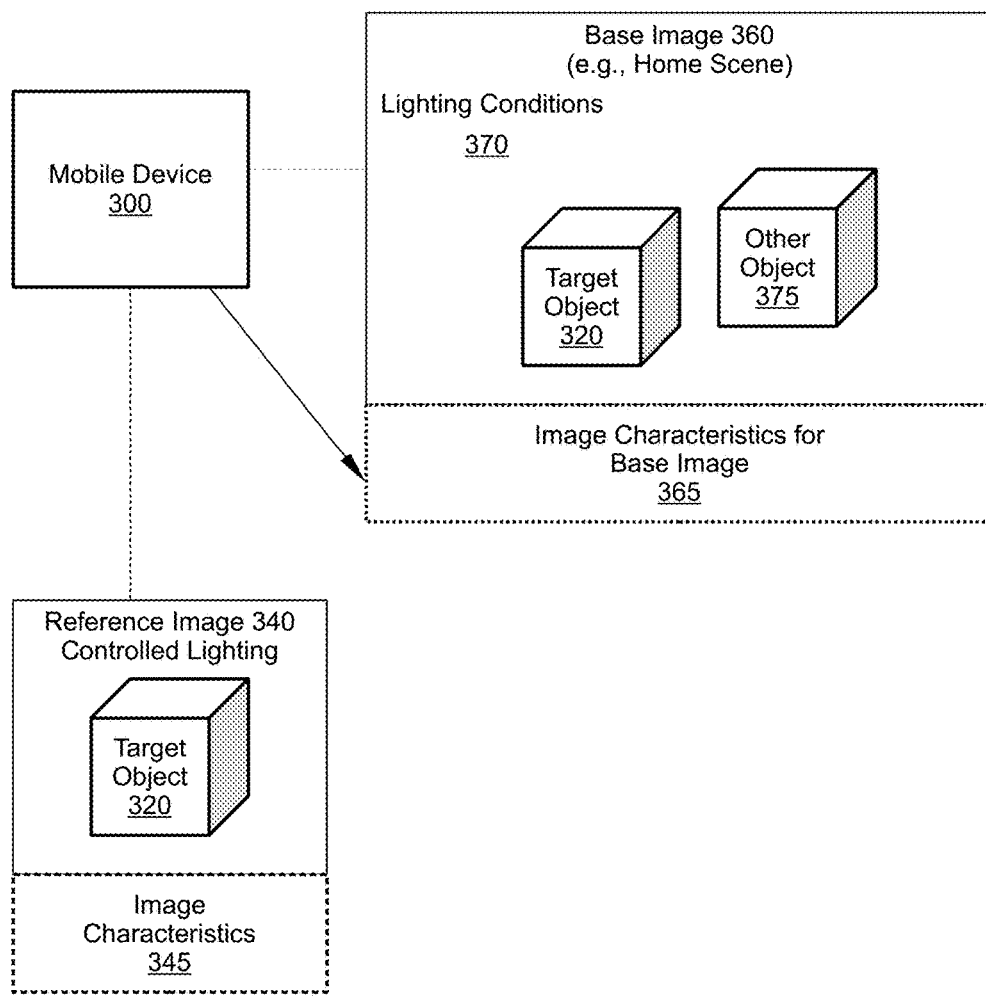
FIG. 3 is an illustration of image calibration according to an embodiment.
Figure 4:
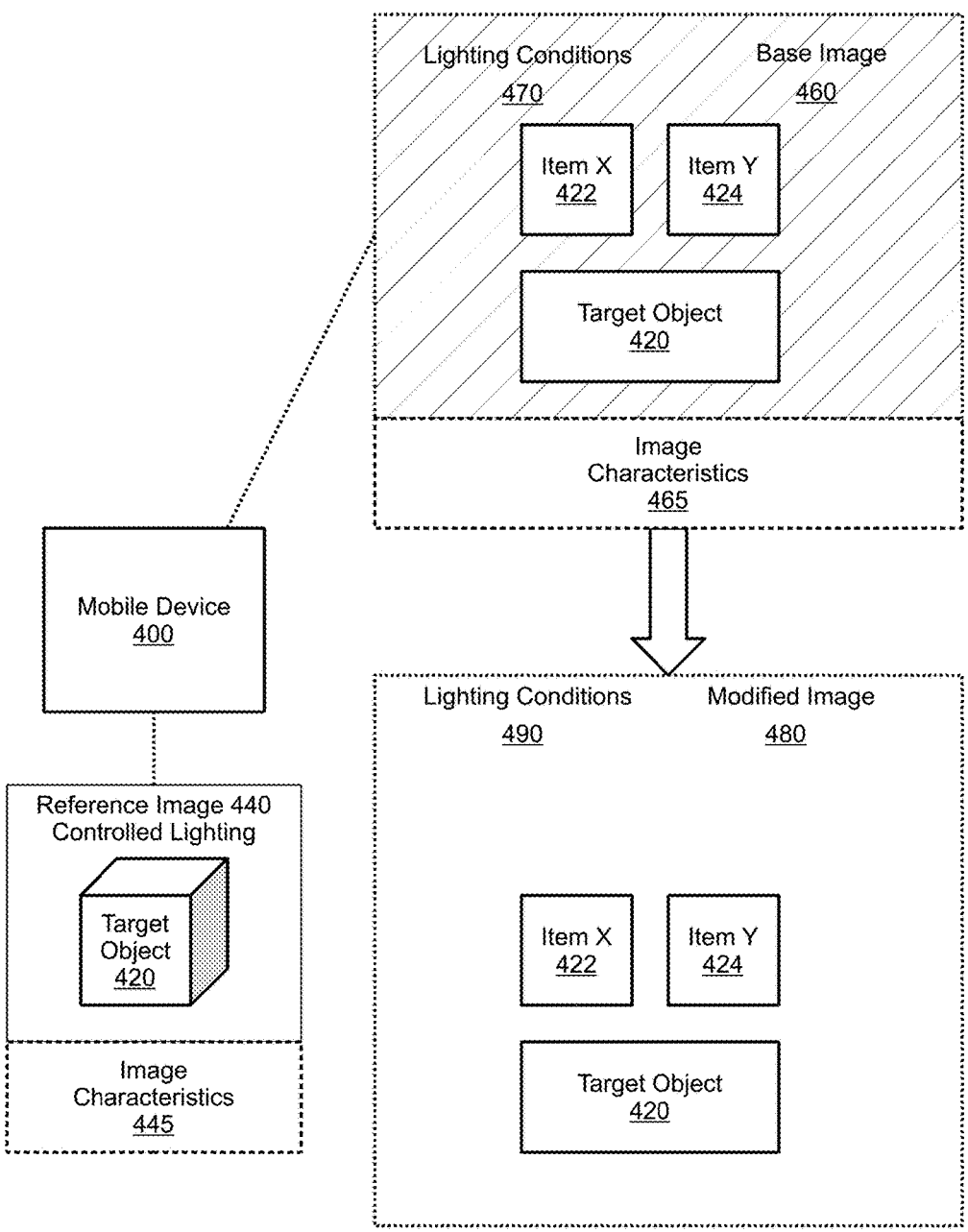
FIG. 4 is an illustration of image modification according to an embodiment.

In some embodiments, the identified reference image 140 may be utilized in one or more image processing functions, including image combining illustrated in FIG. 2, image calibration illustrated in FIG. 3, or image modification illustrated in FIG. 4.

FIG. 2 is an illustration of image combining according to an embodiment. In this illustration, a mobile device 200 captures or otherwise obtains a base image 260, where the base image includes certain items, such as item A 280. In one example, the base image is an image of an environment within a home. As illustrated, the base image 260 is captured with lighting conditions 270, which may, for example, be lighting in the home at particular time of day.

In some embodiments, the mobile device may be utilized to combine a certain target object 220 into the base image 260. In some embodiments, a reference image 240 containing the target object may include a set of image characteristics 245, while the base image has been determined to have image characteristics 265. In some embodiments, the reference image 240 may be identified as illustrated in FIG. 1. In some embodiments, the mobile device 200 is used to compare the image characteristics 245 and 265, and to generate one or more correction factors based on the comparison, wherein the correction factors reflect a difference between the lighting, color, or both lighting and color of the two images. In some embodiments, the mobile device is to apply the one or more correction factors to the reference image to modify the image to transform the target object to lighting conditions 270 of the base image 260. In some embodiments, the mobile device is used to combine the target object 220 with the base image 260 to generate a combined image, wherein the target object is modified to appear as if captured under lighting conditions 270.

FIG. 3 is an illustration of image calibration according to an embodiment. In some embodiments, a mobile device 300 may capture a certain base image 360, such as an image in a home, under lighting conditions 370. Initially image characteristics for the base image 360 may not be known. In this illustration, the image may include one or more objects, including a particular target object 320 and one or more other objects 375.

In some embodiments, the mobile device 300 may identify a reference image 340 containing, for example, the target object 320. In some embodiments, the reference image 340 may be identified as illustrated in FIG. 1. The reference image 340 may be an image captured under controlled lighting conditions, with image characteristics 345.

In some embodiments, the identification of reference images may optionally be based upon selection of a particular object or objects in the base image 360. In an example, the base image 360 may include varying lighting for different objects, and thus the choice of object, such as a choice of target object 320, affects the comparison of objects between the reference image and the base image. For example, the mobile device may include a function to allow a user to tag a particular object for searching in a base image.

In some embodiments, the mobile device may compare the target object 320 in the reference image 340 with the target object 320 in the base image 360, the mobile device using the comparison to calibrate a set of image characteristics 365 for the base image 360. In some embodiments, the mobile device 300 is to save the set of image characteristics 365 as metadata related to the base image 360. In some embodiments, the set of image characteristics may be related to a particular portion of the base image, such as in a circumstance in which the base image includes varying lighting conditions for different objects. In some embodiments, the mobile device 300 may generate multiple sets of image characteristics for the base image 360, wherein each set of image characteristics is associated with an identified object in the base image, and wherein the collection of information represented by the image characteristics and association with identified target objects having reference images is included in the definition of the metadata for the calibrated base image.

FIG. 4 is an illustration of image modification according to an embodiment. In this illustration, a base image 460 is captured under lighting conditions 470, where the base image 460 may be captured or retrieved by mobile device 400. The base image 460 may include a set of image characteristics 465. In some embodiments, the image characteristics may be calibrated as illustrated in FIG. 3. As illustrated, the base image 460 includes one or more objects, such as item X 422, item Y 424, and a particular target object 420. In a particular example, the lighting conditions 470 may be relatively poor, such as insufficient lighting for the base image.

In some embodiments, the mobile device may identify a reference image based on objects in the base image 460, such as reference image 440 containing the target object and a set of image characteristics 445. In some embodiments, the reference image 440 is identified as illustrated in FIG. 1.

In some embodiments, the mobile device 400 is to compare the image characteristics 465 of the base image 460 with the image characteristics 445 of the reference image 440. In some embodiments, the mobile device is to generate one or more correction factors based on the comparison of image characteristics. In some embodiments, the mobile device is to apply the one or more generated correction factors to the base image 460 to modify the lighting, coloring, or both of the base image. As illustrated the mobile device 400 is to generate a modified image 480, where the modified image 480 may include simulated lighting conditions 490 based upon the comparison of image characteristics. The lighting conditions 490 may, for example, be based upon the controlled lighting condition of the reference image 440. In a particular example, poor lighting conditions 470 for the base image may be improved in the modified image 480.

Figure 5:
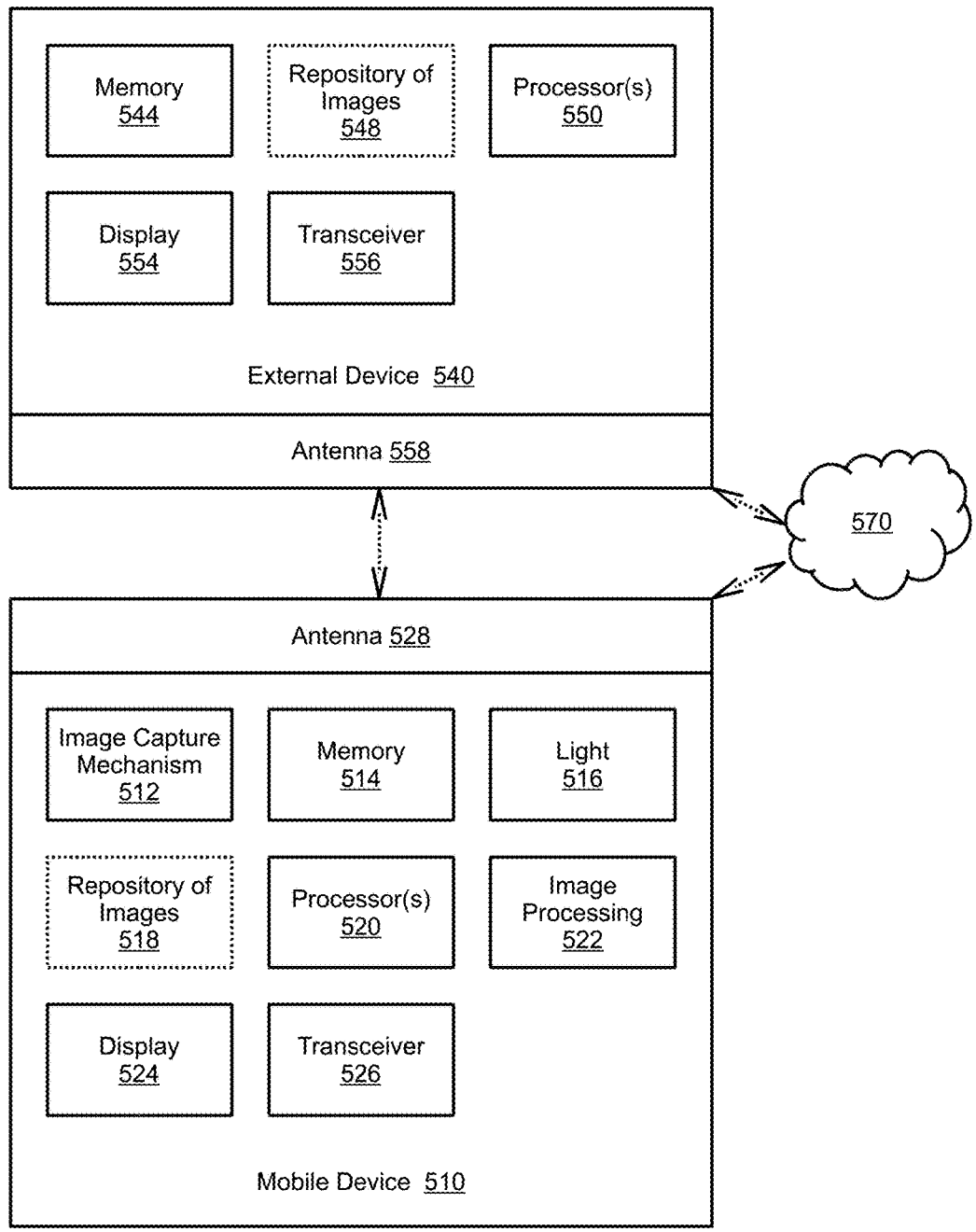
FIG. 5 is an illustration of a mobile device and external device according to an embodiment.

FIG. 5 is an illustration of a mobile device and external device according to an embodiment. In some embodiments, a mobile device 510 provides for image processing using reference images. In some embodiments, the mobile device may cooperate with an external device 540 for certain functions or data. In some embodiments, the external device may include an external server, including an external server accessed via a network. In some embodiments, the mobile device 510 includes an image capture mechanism 512 to capture images, where the image capture device may, for example, include a video camera mechanism to capture video images as well as a camera mechanism to capture still images. In some embodiments, the mobile device includes memory 514 to store captured images and modified images. In some embodiments, the mobile device 510 may include a light 516 that may be utilized to provide light for an image, but such light is not necessary for all devices.

In some embodiments, the mobile device 510 includes or otherwise has access to a repository of images, wherein some or all of the repository may be, for example, contained in the mobile device 510, such as repository 518, in an external device, such as repository 548, or in cloud storage 570. In some embodiments, one or more references are identified based upon a comparison of objects in an image with reference objects contained in reference images stored in a repository. In some embodiments, the mobile device 510 may include one or more processors 520 and may further include a separate image processing module 522, wherein the processors or image processing module may provide for one or more of searching images for objects, comparing objects with reference objects contained in reference images stored in a repository of images, identifying one or more reference images based on the comparison with reference images, generating correction factors, and applying the correction factors to modify image characteristics.

In some embodiments, the mobile device 510 further includes a display 524, which may be utilized to display captured images and modified images, and a transceiver 526 to transmit and receive data using an antenna 528, where the data may include image data. In some embodiments, the transmission of data may include the transmission of data for captured images and modified images in cloud storage accessed via network 570, such as by connection of the mobile device via Wi-Fi or a cellular connection to the Internet. In some embodiments, the mobile device 510 may provide for all processes for image processing.

In some embodiments, an external device 540 may operate in cooperation with the mobile device 510 for image processing, where the external device may be an external service, including a server accessed via a network, or a separate computing device, such as a laptop or tablet computer. The mobile device 510 and the external device 540 may communicate via a network 570 or directly, such as via wireless link. In some embodiments, the external device 540 may operate with the mobile device 510 to provide for image processing, such as by providing reference images or processing power for the image processing. In some embodiments, in addition to other elements, the external device 540 includes a memory 544, which may include memory for the storage of captured images and modified images; a repository of images that includes reference images 548; one or more processors 550, which may include image processing; a display 554; and a transceiver 556 for transmission of data via an antenna 558. In a possible embodiment, the mobile device 510 may capture an image using image capture mechanism 512 or retrieve the image from memory, and transfer at least a part of the image to the external device for comparison, processing, or both of the image. In some embodiments, the external device may provide reference images, processed images, or other data to the mobile device.

Figure 6:
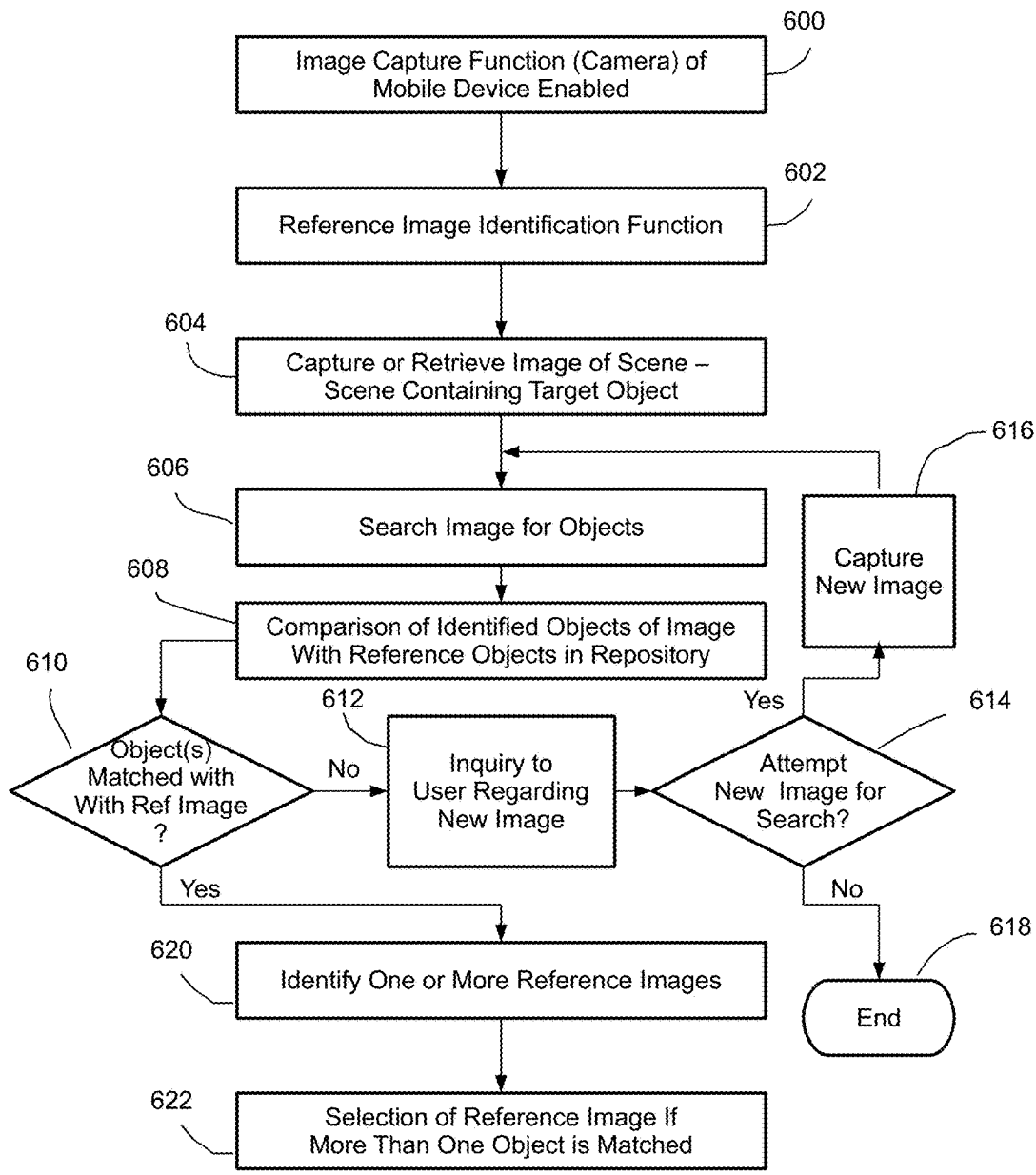
FIG. 6 is a flow chart to illustrate a process for reference image identification according to an embodiment.

FIG. 6 is a flow chart to illustrate a process for reference image identification according to an embodiment. In some embodiments, the operations may be provided by a mobile device that captures an image, such as mobile device 510 illustrated in FIG. 5. In some embodiments, image processing may be provided at least in part by another device, such as external device 540 illustrated in FIG. 5, operating with a mobile device.

For the examples herein, digital images can be stored in any image format, such as RAW format (referring to unprocessed or minimally processed image data), TIFF (Tagged Input File Format), JPEG (Joint Photographic Experts Group) format, GIF (Graphics Interchange Format), or BMP format (referring to bitmap format), and with any image resolution. In general, digital images have associated image characteristics, such as, for example, brightness, contrast, detail (or spatial resolution), and noise. Brightness, for example, can be affected by monitor or camera quality, ambient light levels, or both. Contrast, for example, can be affected by filtration, subject contrast, overexposure, underexposure, bit depth, or a combination of such factors. Detail, for example, can be affected by data sampling, pixel size/pitch, pixel density, motion, matrix size, crystal shape, geometric factors, or a combination of such factors.

The brightness (or luminous brightness) of a digital image is a measure of relative intensity values across the pixel array after the image has been acquired with a digital camera. Intensity (or radiant intensity) refers to the magnitude or quantity of light energy actually reflected from or transmitted through the object being imaged by the camera. In terms of digital image processing, brightness is the measured intensity of all the pixels of the digital image after it has been captured, Pixel brightness is a factor in digital images, because (other than color) it is the only variable that can be utilized by processing techniques to quantitatively adjust the image.

After an object has been imaged and sampled, each resolvable unit may be represented by a digital integer. The accuracy of the digital value is directly proportional to the bit depth of the camera. For example, if two bits are utilized, the image can only be represented by four brightness values or levels. If three or four bits are processed, the corresponding images have eight and sixteen brightness levels, respectively.

In general, the Red-Green-Blue (RGB) color space is utilized by image sensors to detect and generate color digital images, but other color spaces can also be utilized. These color-space models represent different methods of defining color variables, such as hue, saturation, brightness, or intensity, and can be arbitrarily modified to suit the needs of a particular application.

The most popular alternative color-space model is the hue, saturation, and intensity (HSI) color space, which represents color in an intuitive way (the manner in which humans tend to perceive it). Instead of describing characteristics of individual colors or mixtures, as with the RGB color space, the HSI color space is modeled on the intuitive components of color. For example, the hue component controls the color spectrum (red, green, blue, yellow, etc.), while the saturation component regulates color purity, and the intensity component controls how bright the color appears.

In some embodiments, an image capture function of a mobile device may for example, be enabled 600, such as switching to a camera function. In some embodiments, a reference image identification function 602 may include obtaining, such as capturing or retrieving, a base image of a scene, where the scene may contain a certain target object. In some embodiments, the base image is searched for recognizable objects 606. In some embodiments, a comparison is performed between the objects of the base image and reference objects in reference images stored in a repository 608. In some embodiments, the mobile device at least in part performs the comparison between the objects and reference images. In some embodiments, the comparison is performed at least in part by an external apparatus, such as an external server having access to the repository of images, wherein the mobile device may provide at least part of the base image to the external device for comparison with reference images.

In some embodiments, if one or more objects in the base image do not match reference objects in the reference images 610, then an inquiry may be made to a user of the mobile device regarding whether a new image should be captured 612. If the mobile device receives an instruction to attempt a new image for the image processing 614, then the mobile device may capture a new image 616 and return to search the new image image for objects 606. If the mobile device does not receive an instruction to capture a new image 614, the function may end.

In some embodiments, if one or more objects are detected and matched with one or more reference objects in reference images, one or more reference images are identified for the base image 620. In some embodiments, optionally a selection of a particular reference image may be received from a user if, for example, more than one object in the image matches objects of reference images 622. In some embodiments, each reference image may include a set of image characteristics.

Figure 7:
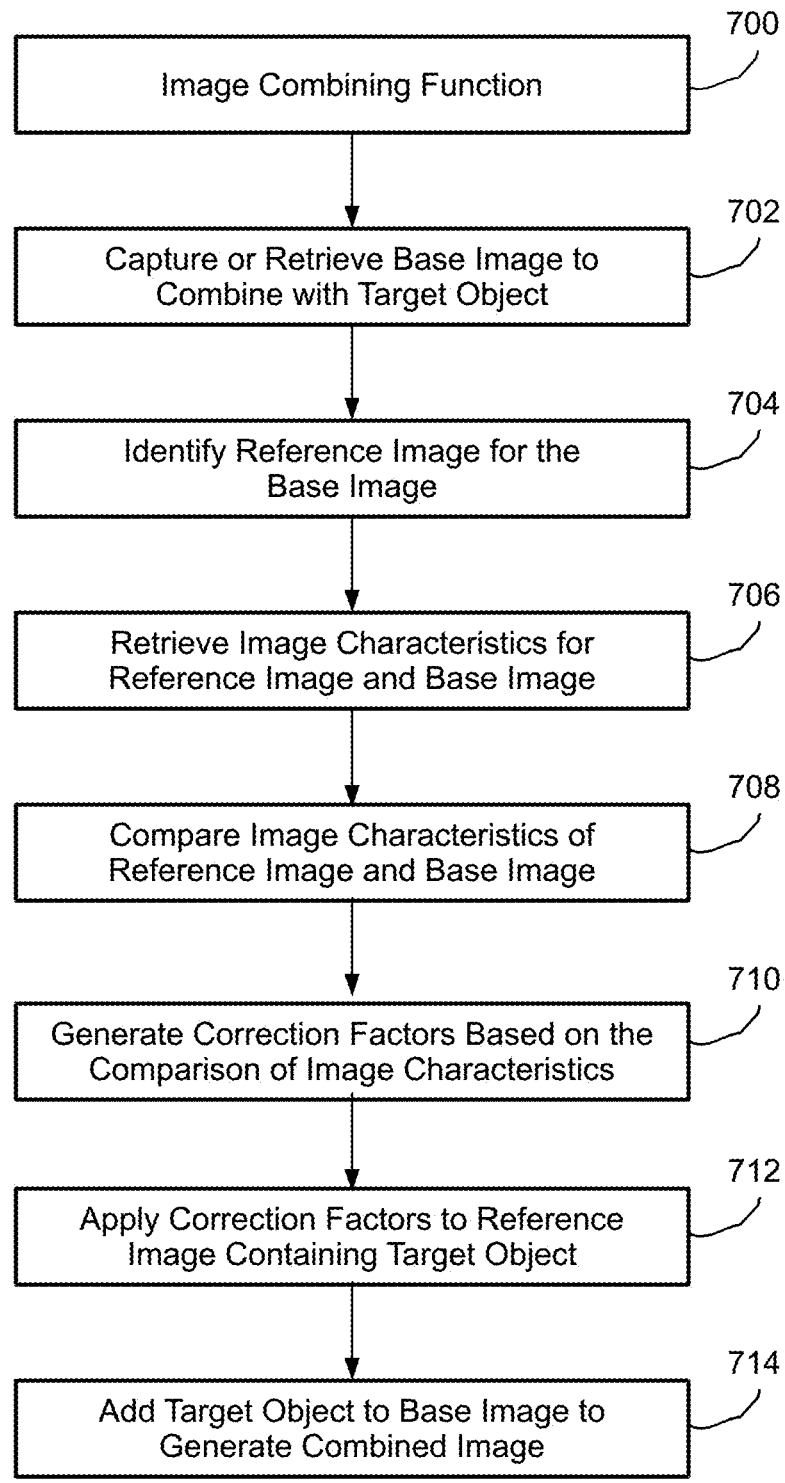
FIG. 7 is a flow chart to illustrate a process for image combining according to an embodiment.

FIG. 7 is a flow chart to illustrate a process for image combining according to an embodiment. In some embodiments, for an image combining function 700, a base image is obtained, which may include capturing a base image with a mobile device or retrieving a previously captured base image 702. In some embodiments, obtaining the base image includes acting in response to an instruction from a user. In some embodiments, a reference image is identified for the base image 704, wherein a process for identifying the reference image may be as illustrated in FIG. 6.

In some embodiments, the image characteristics for the reference image and the base image are retrieved 706. In some embodiments, the image characteristics for the base image may be calibrated as illustrated in FIG. 8.

In some embodiments, the image characteristics of the reference image and the base image are compared 708, and one or more correction factors are generated based on the comparison of image characteristics 710. In some embodiments, the one or more correction factors are applied to the reference image containing the target object 712, thereby modifying the lighting, color, or both of the target object in the image in accordance with the image characteristics of the base image. In some embodiments, the modified target object is added to the base image to generate a combined image 714.

Figure 8:
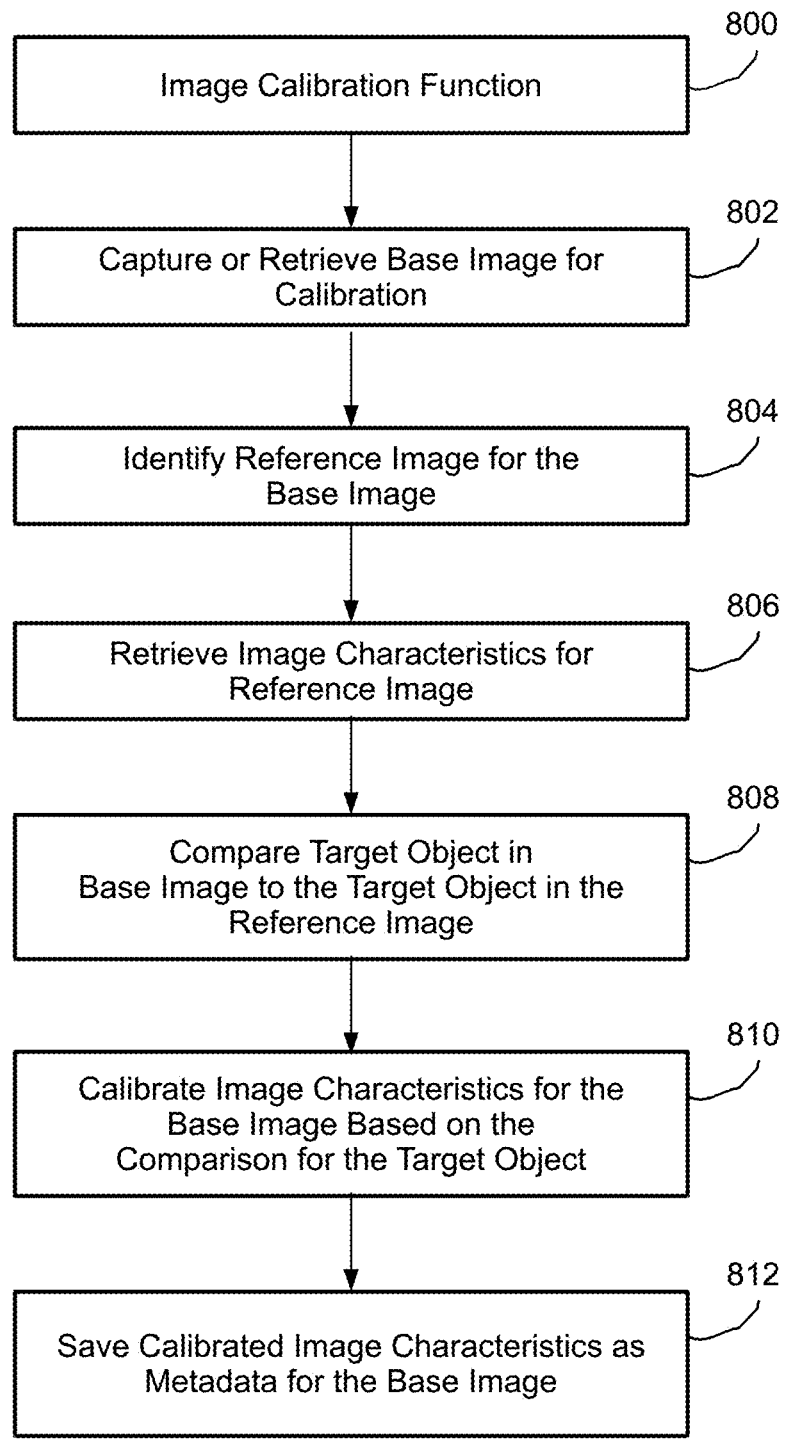
FIG. 8 is a flow chart to illustrate a process for image calibration according to an embodiment.

FIG. 8 is a flow chart to illustrate a process for image calibration according to an embodiment. In some embodiments, for an image calibration function 800, a base image is obtained, which may include capturing a base image with a mobile device or retrieving a previously captured base image 802. In some embodiments, a reference image is identified for the base image 804, wherein a process for identifying the reference image may be as illustrated in FIG. 6. The reference image may have been captured under controlled lighting conditions. Thus, the reference image and the base image contain a particular target object, with the image characteristics of the reference image being known.

In some embodiments, the image characteristics for the reference image are retrieved 806. In some embodiments, the target object in the base image and the target object in the reference image are compared 808, and image characteristics are calibrated based on the comparison for the target object 810. In this way, the known characteristics of the reference image are used to estimate the image characteristics of the base image. In some embodiments, the calibrated image characteristics (and their association with the target object) are stored as metadata for the base image 812. Such calibrated image characteristics may be used in, for example, imaging combining as illustrated in FIG. 7 and image modification as illustrated in FIG. 9.

Figure 9:
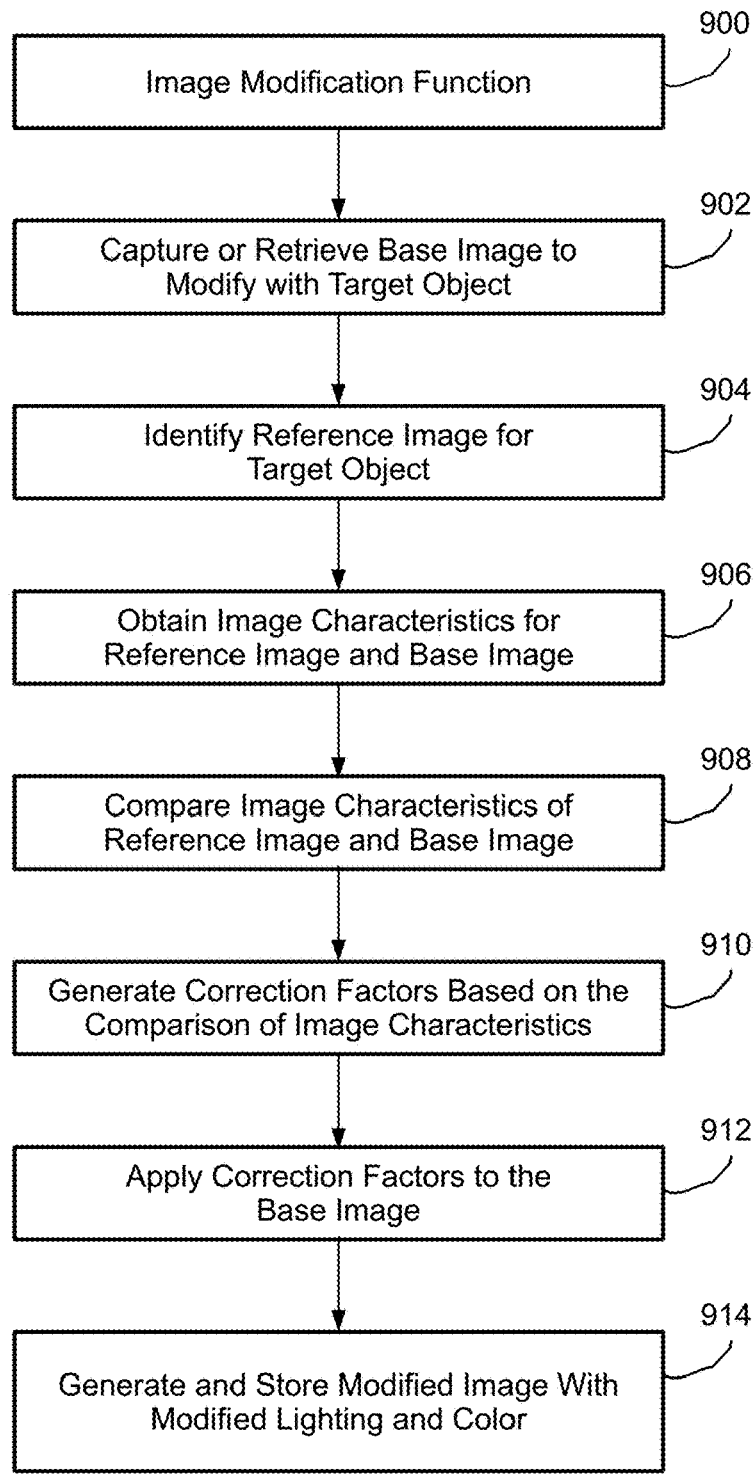
FIG. 9 is a flow chart to illustrate a process for image modification according to an embodiment.

FIG. 9 is a flow chart to illustrate a process for reference image modification according to an embodiment. In some embodiments, for an image modification function 900, a base image is obtained, which may include capturing a base image with a mobile device or retrieving a previously captured base image 902. In some embodiments, obtaining the base image includes acting in response to an instruction from a user. In some embodiments, a reference image is identified for the base image 904, wherein a process for identifying the reference image may be as illustrated in FIG. 6.

In some embodiments, the image characteristics for the reference image and the base image are retrieved 906. In some embodiments, the image characteristics for the base image may be calibrated as illustrated in FIG. 8.

In some embodiments, the image characteristics of the reference image and the base image are compared 908, and one or more correction factors are generated based on the comparison of image characteristics 910. In some embodiments, the one or more correction factors are applied to the base image 912, thereby modifying the lighting, color, or both of the base image using the image characteristics of the reference image. However, the modification of the lighting and color of the base image is not limited to a modification that matches the image characteristics of the reference image, but may further include a plurality of different lighting possibilities for the base image. In some embodiments, a modified image is generated from the base image 914, the modified image including modified lighting, color, or both based on the comparison of image characteristics. In some embodiments, the modified image may be stored in addition to or in place of the original base image.

Figure 10:
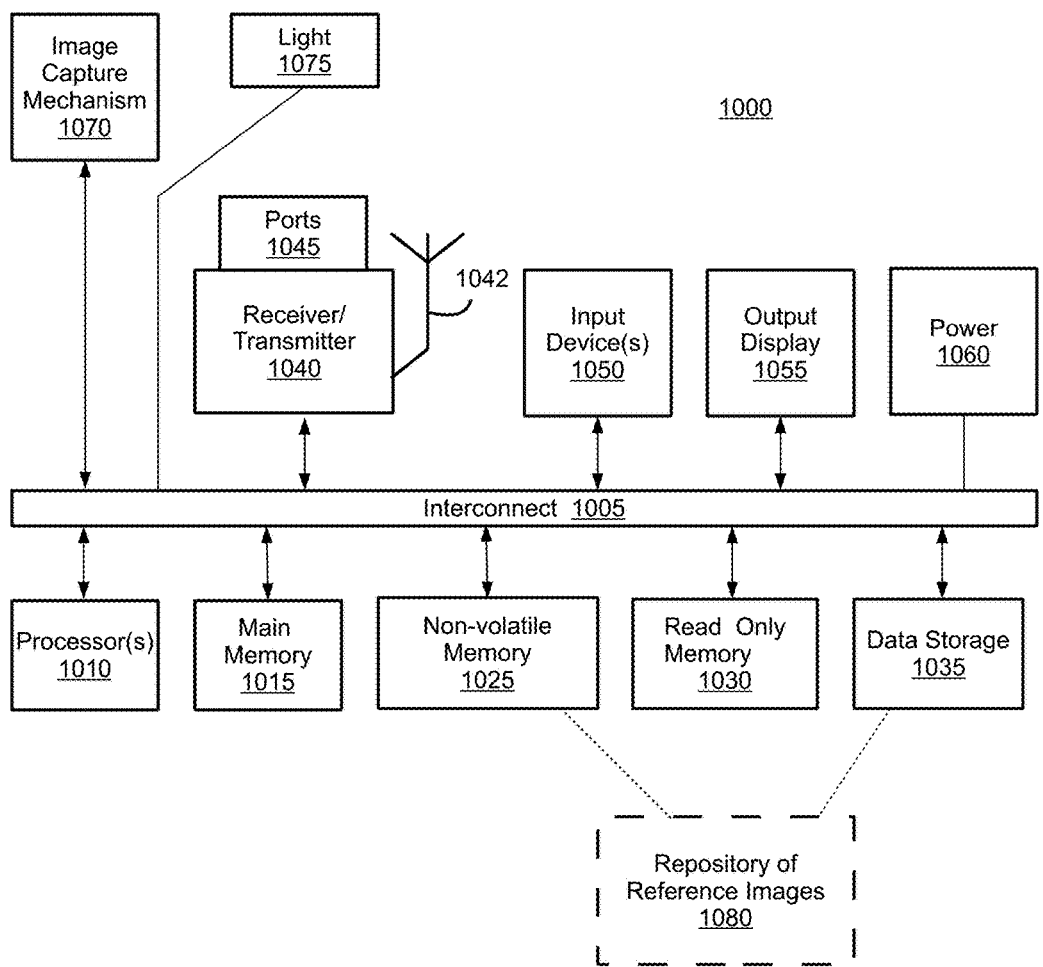
FIG. 10 is a block diagram of an embodiment of an apparatus or system.

FIG. 10 is a block diagram of an embodiment of an apparatus or system. In this illustration, certain standard and well-known components that are not germane to the present description are not shown. Elements shown as separate elements may be combined, including, for example, an SoC (System on Chip) combining multiple elements on a single chip.

In some embodiments, an apparatus or system 1000 (referred to in general as an apparatus) may be a mobile device, such as mobile device 510 in FIG. 5, or an external device, such as external device 540 in FIG. 5, operating in cooperation with a mobile device. In some embodiments, the apparatus may operate to provide automatic image modification of captured images based on reference images. In some embodiments, the apparatus may operate to generate new reference images based on captured images.

Under some embodiments, the apparatus 1000 includes an interconnect or crossbar 1005 or other communication means for transmission of data. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, pointto-point connections, or both connected by appropriate bridges, adapters, or controllers.

The apparatus 1000 may include a processing means such as the one or more processors 1010 coupled to the interconnect 1005 for processing information. The processors 1010 may comprise one or more physical processors and one or more logical processors. The processing of information may include processing image data for automatic image modification.

In some embodiments, the apparatus 1000 further comprises a random access memory (RAM) or other dynamic storage device or element as a main memory and other memory (including memory buffers) 1015 for storing information and instructions to be executed by the processors 1010. The apparatus 1000 may include one or more non-volatile memory elements 1025, including, for example, flash memory, for the storage of certain elements, including images. The apparatus 1000 also may comprise a read only memory (ROM) 1030 or other static storage device for storing static information and instructions for the processors 1010, and data storage 1035, such as a hard drive solid state drive, for the storage of data. In some embodiments, the apparatus 1000 includes or has access to a repository of images 1080 for use in comparison in the automatic modification of images, where the repository 1080 may be contained in one or more of the non-volatile memory and the data storage. In other embodiments, the repository 1080 may be contained in external storage, such as cloud storage. The reference images may be copied into main memory 1015 for comparison operations and other purposes.

In some embodiments, the apparatus 1000 includes an image capture device 1070, such as the camera of a mobile device, for use in capturing images, including images that are subject to image modification using reference images. In some embodiments, the apparatus 1000 includes a light 1075 that may be used to at least partially illuminate a scene for image capture.

In some embodiments, the apparatus 1000 includes one or more transmitters or receivers 1040 coupled to the interconnect 1005. In some embodiments, the apparatus 1000 may include one or more antennas 1042 for the transmission and reception of data via radio signals. In some embodiments, the data that is transmitted and received may include image data or portions of image data. In some embodiments, the apparatus includes one or more ports 1045 for interconnection with one or more cables or other connections.

In some embodiments, the apparatus 1000 includes one or more input devices 1050 for the input of data, including hard and soft buttons, a joy stick, a mouse or other pointing device, voice command system, or gesture recognition system. In some embodiments, the apparatus 1000 includes an output display 1055, where the display 1055 may include a liquid crystal display (LCD) or any other display technology, for displaying information or content to a user. In some environments, the display 1055 may include a touch-screen that is also utilized as at least a part of an input device 1050.

The apparatus 1000 may also comprise a battery or other power element 1060, which may include a solar cell, a fuel cell, a charged capacitor, or other system or device for providing or generating power in an apparatus. The power provided by the power element may be distributed as required to elements of the apparatus 1000.

Figure 11:
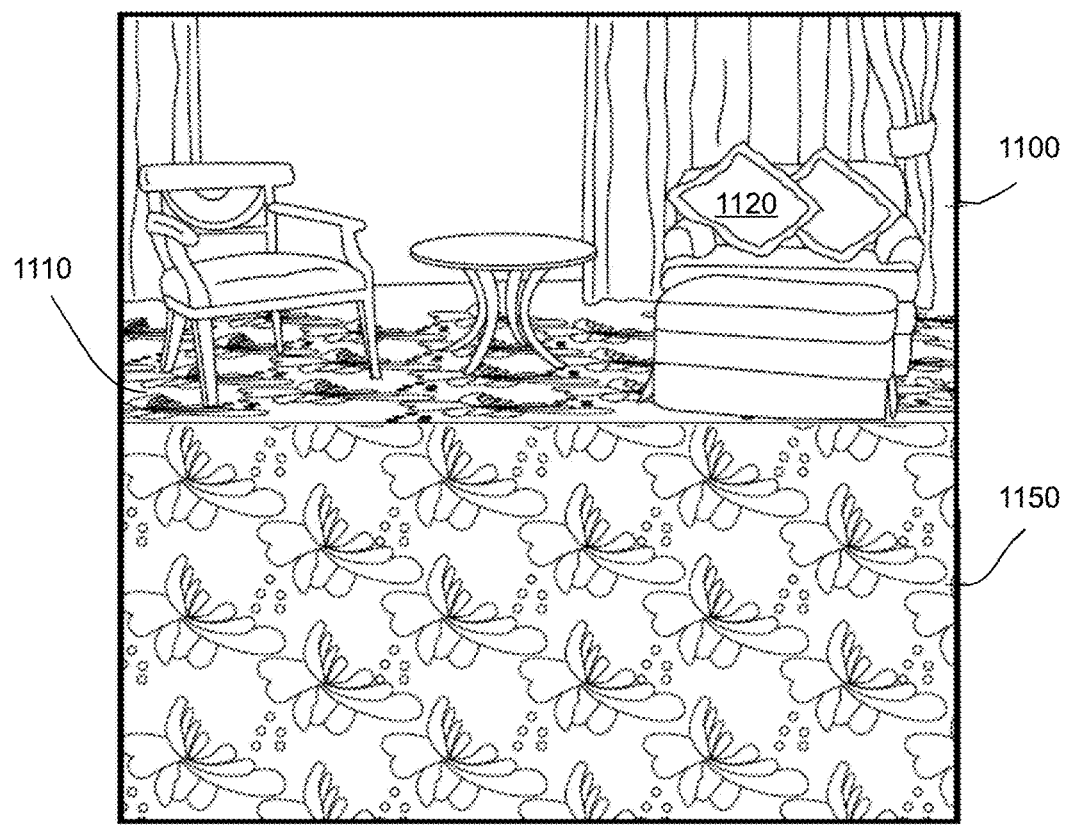
FIG. 11 illustrates an example reference scene and an example image for image correction according to an embodiment.

FIG. 11 illustrates an example reference scene and an example image for image processing according to an embodiment. In this illustration, an apparatus may be utilized by a user to capture one or more base images, where the base images may be, for example, one or more of rooms within a home, such as a living room, bedroom, and kitchen. In some embodiments, the mobile device performs a reference image identification function, wherein the mobile device may confirm for each photo that an object in the photo was recognized and matched with a reference image. In some embodiments, the mobile device performs an image calibration function to calibrate a set of image characteristics for an image. In FIG. 11, for example, in scene 1100, the room image may have been "calibrated" using the rug 1110 (or any other object in the scene) if the rug is found in a reference image. In this illustration, the rug 1110 is shown in reference image 1150. In another example, a calibration item may be added to the scene to aid in the calibration of the base image, the calibration item being a known object that is contained in at least one reference image.

The difference in color, lighting, or both for the object as shown in the image 1100 as compared to object 1150 as pictured under ideal lighting conditions in the reference image allow the captured image of the room to be "calibrated" and stored image characteristics would enable this delta in lighting to be applied later to another image. In this particular example, a comparison between the color, lighting, or both of the rug in the base image 1100 and the reference image 1150 is used to calibrate the base image 1100. A user may choose to take such calibration images under multiple lighting conditions, such as morning light, evening light, or artificial lighting (fluorescent or incandescent bulb lighting, etc.), wherein the mobile device generates and saves a set of image characteristics for each image, which may be named for the particular conditions. In some embodiments, the reference images may be stored in cloud storage for future reference when shopping.

For example, when a user is shopping and sees an item, such as such as a pillow 1120, to consider buying. For the purposes of this example, it may be assumed that the pillows 1120 shown on the chair in image 1100 are not present in the base image. In this example, the user may enable a reference image identification function, and then take a photograph of the item. In some embodiments, the item is recognized and compared with reference images for that item being sold. In an example, the store may maintain reference images containing the item, to enable easy recognition. Alternatively, the reference image may be looked up by barcode or other such identifier.

In some embodiments, if a reference image found, the mobile device may provide feedback that identification was successful. In some embodiments, the user may enable an image combining function, retrieve a base photo of the living room in, for example, morning light and insert a modified version of the pillow 1120 into the base image 1100 to estimate similar lighting conditions, and compare the items under such circumstances. For the purposes of this example, the reference image and the base image are combined to provide an image in which the pillow 1120 appears to present in the image 1100, thus allowing for viewing how the item (the pillow) coordinates with the other items in the scene.

In some embodiments, the user may further enable an image modification function to change lighting of the base image. For example, in FIG. 11, certain colors in the base image 1100, such a bright color fabric of a pillow or other item. may be toned down to match the morning light photo of a living room to simulate how it would appear under the same lighting conditions.

In another example, in order to match color of a first clothing item in a store with an already purchased second item at home, to see if the colors are likely to be compatible, lighting conditions may be normalized to allow comparing the two items. In this example, it may not be necessary to generate a reference image of the already purchased item—if item was purchased recently, it might be possible to look up the item online, obtain a reference photo to be downloaded to the phone or personal cloud, then proceed with the comparison with the new item. The value of aiding a shopper to make a purchase decision while still in the store may provide incentive to stores and manufacturers to build a database of reference images for products, captured under a set of ideal or standardized lighting conditions.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B", element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a mobile device, including a mobile device to perform image processing utilizing reference images, includes: an image capture mechanism to capture a base image, the base image containing one or more objects including a target object; and a memory to store data, the data including the base image. In some embodiments, the mobile device is to analyze the base image to identify one or more objects in the base image, and identify one or more reference images based on a comparison of one or more identified objects in the base image with reference images in a repository of images, wherein the one or more reference images include a first reference image containing the target object, the first reference image having a first set of first image characteristics.

In some embodiments, the first set of image characteristics includes one or more lighting characteristics, one or more color characteristics, or both for the first reference image.

In some embodiments, the first set of image characteristics includes metadata for the first reference image.

In some embodiments, the mobile device is to perform the comparison of the one or more identified objects in the base image with reference images in the repository of images.

In some embodiments, an external device is to perform the comparison of the one or more identified objects in the base image with reference images in the repository of images. In some embodiments, the mobile device is to provide at least a part of the base image to the external device.

In some embodiments, at least a portion of the repository is stored externally from the mobile device. In some embodiments, the mobile device is to retrieve one or more reference images from cloud storage.

In some embodiments, at least a portion of the repository is stored on the mobile device.

In some embodiments, the mobile device includes an image combining function, wherein the image combining function includes the mobile device operating to: compare the first set of image characteristics with a set of image characteristics for the base image; generate one or more correction factors based on the comparison of image characteristics; and apply the one or more correction factors to the first reference image to modify lighting, color, or both of the first reference image.

In some embodiments, the image combining function further includes the mobile device operating to combine the target object from the modified reference image to the base image.

In some embodiments, the mobile device includes an image calibration function, wherein the image calibration function includes the mobile device operating to: compare the target object in the first reference image with the target object in the base image; calibrate a set of image characteristics for the base image based on the comparison for the target object; and save the calibrated set of image characteristics for the base image.

In some embodiments, the mobile device includes an image modification function, wherein the image modification function includes the mobile device operating to: compare the first set of image characteristics with a set of image characteristics for the base image; generate one or more correction factors based on the comparison of image characteristics; and apply the one or more correction factors to the base image to modify lighting and color of the base image.

In some embodiments, the image modification function includes automatically applying the correction factors prior to saving an image.

In some embodiments, a method, including a method to perform image processing utilizing reference images, includes: obtaining a base image of a scene, the scene including a target object; searching the base image to identify one or more objects in the base image; and identifying one or more reference images based on a comparison of one or more identified objects from the base image with reference images in a repository of images, the one or more reference images including a first reference image containing the target object, the first reference image having a first set of first image characteristics.

In some embodiments, the first set of image characteristics includes lighting characteristics, color characteristics, or both for the first reference image.

In some embodiments, the method further includes storing the first set of image characteristics as metadata for the first reference image.

In some embodiments, the method further includes performing one or more additional image processing functions, the image processing functions including one or more of: an image combining function to combine a target object in the reference image with the base image; an image combining calibration function to calibrate a set of image characteristics for the base image; or an image modification function to modify lighting, color, or both of the base image.

In some embodiments, the method further includes performing an image combining function including: comparing the first set of image characteristics with a set of image characteristics for the base image; generating one or more correction factors based on the comparison of image characteristics; and applying the one or more correction factors to the first reference image to modify lighting and color of the first reference image.

In some embodiments, performing the image combining function further includes: combining the target object from the modified reference image with the base image.

In some embodiments, the method further includes performing an image calibration function including: comparing the target object in the first reference image with the target object in the base image; calibrating a set of image characteristics for the base image based on the comparison for the target object; and saving the calibrated set of image characteristics for the base image.

In some embodiments, the method further includes performing an image modification function including: comparing the first set of image characteristics with a set of image characteristics for the base image; generating one or more correction factors based on the comparison of image characteristics; and applying the one or more correction factors to the base image to modify lighting and color of the base image.

In some embodiments, performing the image modification function includes automatically applying the correction factors prior to saving an image.

In some embodiments, the method further includes selecting the first reference image based at least in part on a selection of an object in the base image.

In some embodiments, the mobile device is to perform the comparison of the one or more identified objects in the base image with reference images in the repository of images.

In some embodiments, an external device is to perform the comparison of the one or more identified objects in the base image with reference images in the repository of images.

In some embodiments, a machine-readable storage includes machine-readable instructions that, when executed, implement a method as provided in any of the method processes above.

In some embodiments, a system, including a system to perform image processing utilizing reference images, includes: a mobile device including: an image capture mechanism to capture a base image, the base image containing one or more objects including a target object, a memory to store data, the data including the base image, and a transceiver; and an external device to operate cooperatively with the mobile device for image processing, the external device including a transceiver to communicate with the mobile device. In some embodiments, the system includes a reference image identification function, the reference image identification function including the system to: analyze the base image to identify one or more objects in the base image, compare one or more identified objects from the base image with reference images in a repository of images, and identify one or more reference images containing at least one image matching an identified object in the base image, including a first reference image containing the target object, the first reference image having a first set of first image characteristics.

In some embodiments, the first set of image characteristics includes one or more lighting characteristics, one or more color characteristics, or both for the first reference image.

In some embodiments, at least a portion of the repository is stored externally from the mobile device on the external device.

In some embodiments, at least a portion of the repository is stored on the mobile device.

In some embodiments, the mobile device is to transfer an image to the external device for at least some processing of the image.

In some embodiments, the system includes one or more of: an image combining function to combine a target object in the first reference image with the base image; an image combining calibration function to calibrate a set of image characteristics for the base image; or an image modification function to modify lighting, color, or both of the base image.

In some embodiments, the image combining function includes the system operating to: compare the first set of image characteristics with a set of image characteristics for the base image; generate one or more correction factors based on the comparison of image characteristics; and apply the one or more correction factors to the first reference image to modify lighting, color, or both of the first reference image.

In some embodiments, the image combining function further includes the system operating to: combine the target object from the modified reference image to the base image.

In some embodiments, the image calibration function includes the system operating to: compare the target object in the first reference image with the target object in the base image; calibrate a set of image characteristics for the base image based on the comparison for the target object; and save the calibrated set of image characteristics for the base image.

In some embodiments, the image modification function includes the system operating to: compare the first set of image characteristics with a set of image characteristics for the base image; generate one or more correction factors based on the comparison of image characteristics; and apply the one or more correction factors to the base image to modify lighting and color of the base image.

In some embodiments, a non-transitory computer-readable storage medium has stored thereon data representing sequences of instructions that, when executed by a processor, cause the processor to perform operations including: obtaining a base image of a scene, the scene including a target object; searching the base image to identify one or more objects in the base image; and identifying one or more reference images based on a comparison of one or more identified objects from the base image with reference images in a repository of images, the one or more reference images including a first reference image containing the target object, the first reference image having a first set of first image characteristics.

In some embodiments, the first set of image characteristics includes lighting characteristics, color characteristics, or both for the first reference image.

In some embodiments, the medium further includes instructions for storing the first set of image characteristics as metadata for the first reference image.

In some embodiments, the medium further includes instructions for performing one or more addition image processing functions, the image processing functions including one or more of: an image combining function to combine a target object in the reference image with the base image; an image combining calibration function to calibrate a set of image characteristics for the base image; or an image modification function to modify lighting, color, or both of the base image.

In some embodiments, the medium further includes instructions for performing an image combining function including: comparing the first set of image characteristics with a set of image characteristics for the base image; generating one or more correction factors based on the comparison of image characteristics; and applying the one or more correction factors to the first reference image to modify lighting and color of the first reference image.

In some embodiments, the image combining function further includes combining the target object from the modified reference image with the base image.

In some embodiments, the medium further includes instructions for performing an image calibration function including: comparing the target object in the first reference image with the target object in the base image; calibrating a set of image characteristics for the base image based on the comparison for the target object; and saving the calibrated set of image characteristics for the base image.

In some embodiments, the medium further includes instructions for performing an image modification function including: comparing the first set of image characteristics with a set of image characteristics for the base image; generating one or more correction factors based on the comparison of image characteristics; and applying the one or more correction factors to the base image to modify lighting and color of the base image.

In some embodiments, a selection of the first reference image is based at least in part on a selection of an object in the base image.

In some embodiments, an apparatus, including an apparatus for image processing utilizing reference images, includes: means for obtaining an image of a scene, the scene including a target object; means for searching the base image to identify one or more objects in the base image; means for identifying one or more reference images based on a comparison of one or more identified objects from the base image with reference images in a repository of images, the one or more reference images including a first reference image containing the target object, the first reference image having a first set of first image characteristics.

In some embodiments, the first set of image characteristics includes lighting characteristics, color characteristics, or both for the first reference image.

In some embodiments, the apparatus further includes means for storing the first set of image characteristics as metadata for the first reference image.

In some embodiments, the apparatus further includes one or more of: means to combine a target object in the reference image with the base image; means to calibrate a set of image characteristics for the base image; or means to modify lighting, color, or both of the base image.

In some embodiments, the apparatus further includes means for image combining including: means for comparing the first set of image characteristics with a set of image characteristics for the base image; means for generating one or more correction factors based on the comparison of image characteristics; and means for applying the one or more correction factors to the first reference image to modify lighting and color of the first reference image.

In some embodiments, the means for image combining further includes means for combining the target object from the modified reference image with the base image.

In some embodiments, the apparatus further includes means for image calibration including: means for comparing the target object in the first reference image with the target object in the base image; means for calibrating a set of image characteristics for the base image based on the comparison for the target object; and means for saving the calibrated set of image characteristics for the base image.

In some embodiments, the apparatus further includes means for image modification including: means for comparing the first set of image characteristics with a set of image characteristics for the base image; means for generating one or more correction factors based on the comparison of image characteristics; and means for applying the one or more correction factors to the base image to modify lighting and color of the base image.

In some embodiments, the apparatus further includes means for selecting the first reference image based at least in part on a selection of an object in the base image.

What is claimed is:

1. A mobile device comprising:
an image capture mechanism to capture an image that depicts a target object at a first location and capture a base image at a second location different from the first location, wherein the base image contains a plurality of objects depicted within the base image, wherein the target object is not depicted within the base image and is to be added to the base image; and
a memory to store data, the data including the image and the base image, the base image having one or more image characteristics, the image characteristics including one or more lighting factors, one or more color factors, or both for the base image;
wherein the mobile device is to:
identify one or more reference images from a plurality of reference images based on comparison of the target object from the image captured at the first location with objects depicted in the plurality of reference images, wherein a first reference image of the one or more identified reference images contains the target object, wherein the first reference image comprises a first set of image characteristics, and wherein the first set of image characteristics includes one or more lighting characteristics, one or more color characteristics, or both for the target object as depicted in the first reference image,
analyze the base image to identify one or more objects from the plurality of objects depicted in the base image,
identify the first reference image based on a comparison of the one or more identified objects in the base image captured at the second location with objects in the identified one or more reference images, wherein the first reference image is identified based on the comparison determining that the first reference image contains the target object and an object depicted in the base image, and
perform an image combining function, wherein the image combining function includes the mobile device to:
compare the first set of image characteristics for the first reference image with the set of image characteristics for the base image,
generate one or more correction factors based on the comparison of the set of image characteristics and the first set of image characteristics,
apply the one or more correction factors to the first reference image to modify lighting, color, or both of the first reference image to match the image characteristics of the base image, and
add the target object with the applied correction factors from the modified first reference image to the base image to generate a combined image.

2. The mobile device of claim 1, wherein the first set of image characteristics further includes metadata for the first reference image.

3. The mobile device of claim 1, wherein the mobile device is to perform the comparison of the one or more identified objects in the base image with reference images in the repository of images.

4. The mobile device of claim 1, wherein at least a part of the repository is stored externally from the mobile device.

5. The mobile device of claim 4, wherein the mobile device is to retrieve one or more reference images from cloud storage.

6. A method comprising:
capturing an image that depicts a target object at a first location;
capturing a base image at a second location different form the first location, the base image containing a plurality of objects depicted within the base image, wherein the target object that is not depicted within the base image and is to be added to the base image;
obtaining the base image of a scene, the base image including one or more image characteristics, the image characteristics including one or more lighting factors, one or more color factors, or both for the base image;
identifying one or more reference images from a plurality of reference images based on comparison of the target object from the image captured at the first location with objects depicted in the plurality of reference images, wherein a first reference of the one or more identified reference images contains the target object, wherein the first reference image comprises a first set of image characteristics, and wherein the first set of image characteristics includes one or more lighting characteristics, one or more color characteristics, or both for the target object as depicted in the first reference image;
searching the base image to identify one or more objects from the plurality of objects depicted in the base image;
identifying the first reference image based on a comparison of the one or more identified objects from the base image captured at the second location with object in the identified one or more reference images, wherein the first reference image is identified based on the comparison determining that the first reference image contains the target object and an object depicted in the base image; and
performing an image combining function, wherein the image combining function includes:
comparing the first set of image characteristics for the first reference image with the set of image characteristics for the base image,
generating one or more correction factors based on the comparison of the set of image characteristics and the first set of image characteristics,
applying the one or more correction factors to the first reference image to modify lighting, color, or both of the first reference image to match the image characteristics of the base image, and
adding the target object with the applied correction factors from the modified first reference image to the base image to generate a combined image.

7. The method of claim 6, further comprising performing one or more additional image processing functions, the image processing functions including one or more of:
an image combining calibration function to calibrate a set of image characteristics for the base image; or
an image modification function to modify lighting, color, or both of the base image.

8. The method of claim 6, wherein the mobile device is to perform the comparison of the one or more identified objects in the base image with reference images in the repository of images.

9. The method of 6, further comprising selecting the first reference image based at least in part on a selection of an object in the base image.

10. A non-transitory computer-readable storage medium having stored thereon data representing sequences of instructions that, when executed by a processor, cause the processor to perform operations comprising:

capturing an image that depicts a target object at a first location;

capturing a base image at a second location different form the first location, the base image containing a plurality of objects depicted within the base image, wherein the target object that is not depicted within the base image and is to be added to the base image;

obtaining the base image of a scene, the base image including one or more image characteristics, the image characteristics including one or more lighting factors, one or more color factors, or both for the base image;

identifying one or more reference images from a plurality of reference images based on comparison of the target object from the image captured at the first location with objects depicted in the plurality of reference images, wherein a first reference image of the one or more identified reference images contains the target object, wherein the first reference image comprises a first set of image characteristics, and wherein the first set of image characteristics includes one or more lighting characteristics, one or more color characteristics, or both for the target object as depicted in the first reference image;

searching the base image to identify one or more objects from the plurality of objects depicted in the base image;

identifying the first reference image based on a comparison of the one or more identified objects from the base image captured at the second location with object in the identified one or more reference images, wherein the first reference image is identified based on the comparison determining that the first reference image contains the target object and an object depicted in the base image; and performing an image combining function, wherein the image combining function includes:

comparing the first set of image characteristics for the first reference image with the set of image characteristics for the base image, generating one or more correction factors based on the comparison of the set of image characteristics and the first set of image characteristics, applying the one or more correction factors to the first reference image to modify lighting, color, or both of the first reference image to match the image characteristics of the base image, and adding the target object with the applied correction factors from the modified first reference image to the base image to generate a combined image.

11. The medium of claim 10, wherein the base image includes one or more objects including a first object, and wherein the combined image includes the first object and the target object.

12. The mobile device of claim 1, wherein the base image includes one or more objects including a first object, and wherein the combined image includes the first object and the target object.

13. The method of claim 6, wherein the base image includes one or more objects including a first object, and wherein the combined image includes the first object and the target object.

* * * * *